United States Patent [19]

Hudson et al.

[11] Patent Number: 4,664,777

[45] Date of Patent: * May 12, 1987

[54] PROCESS FOR IMPROVING OCTANE BY THE CONVERSION OF FUSED MULTI-RING AROMATICS AND HYDROAROMATICS TO LOWER MOLECULAR WEIGHT COMPOUNDS

[75] Inventors: Carl W. Hudson; Glen P. Hamner, both of Baton Rouge, La.

[73] Assignee: Exxon Research and Engineering Company, Florham Park, N.J.

[*] Notice: The portion of the term of this patent subsequent to Aug. 26, 2003 has been disclaimed.

[21] Appl. No.: 760,894

[22] Filed: Jul. 31, 1985

Related U.S. Application Data

[63] Continuation-in-part of Ser. No. 635,729, Jul. 30, 1984, abandoned.

[51] Int. Cl.⁴ .................. C10G 45/46; C10G 47/02; C10G 47/20
[52] U.S. Cl. .................................. 208/112; 208/121; 208/144; 585/405
[58] Field of Search ................. 208/112, 121, 144; 585/405

[56] References Cited

U.S. PATENT DOCUMENTS

| 2,057,971 | 10/1936 | Pfirrmann | 208/112 |
| 3,494,857 | 2/1970 | McIlvried et al. | 208/143 |
| 3,816,298 | 6/1974 | Aldridge | 208/112 |
| 3,899,543 | 8/1975 | Cosyns et al. | 208/89 |
| 4,067,799 | 1/1978 | Bearden et al. | 208/112 |
| 4,421,635 | 12/1983 | Murakami et al. | 208/112 |
| 4,508,616 | 4/1985 | Larrauri et al. | 208/111 |
| 4,557,822 | 12/1985 | Bearden, Jr. et al. | 208/112 |
| 4,597,856 | 7/1986 | Yoshioka et al. | 208/112 |

FOREIGN PATENT DOCUMENTS

| 0161493 | 5/1980 | Japan | 208/112 |
| 0177346 | 4/1981 | Japan | 208/112 |
| 0364043 | 12/1931 | United Kingdom | 208/112 |

Primary Examiner—Olik Chaudhuri

[57] ABSTRACT

A process for the conversion of fused two-ring aromatic and fused two-ring hydroaromatic hydrocarbons into lower boiling aromatics, particularly alkylbenzenes of higher octane values. Such feeds are contacted in the presence of hydrogen over an iron catalyst at temperature sufficient to selectively hydrogenate and hydrocrack said fused two-ring aromatic hydrocarbon compound, or fused two-ring hydroaromatic hydrocarbon compounds, or both, to produce lower molecular weight, higher octane components suitable for direct blending with gasoline.

18 Claims, No Drawings

PROCESS FOR IMPROVING OCTANE BY THE CONVERSION OF FUSED MULTI-RING AROMATICS AND HYDROAROMATICS TO LOWER MOLECULAR WEIGHT COMPOUNDS

RELATED APPLICATIONS

This application is related to application Ser. No. 611,859, filed May 18, 1984, titled "Process for the Denitrogenation of Nitrogen-Containing Hydrocarbon Compounds" by Carl W. Hudson, now abandoned and it is a continuation-in-part of application Ser. No. 635,729, filed July 30, 1984, titled "Process for the Removal of Polynuclear Aromatic Hydrocarbon Compounds From Admixtures of Liquid Hydrocarbon Compounds" by Carl W. Hudson and Glen P. Hamner, now abandoned.

Other related applications are: application Ser. No. 760,871, by Carl W. Hudson now U.S. Pat. No. 4,591,430; application Ser. No. 760,961 by Carl W. Hudson and Glen P. Hamner now U.S. Pat. No. 4,608,153; application Ser. No. 760,834, by Carl W. Hudson and Gerald E. Markley; application Ser. No. 760,962, by Carl W. Hudson and Glen P. Hamner; and application Ser. No. 760,835, by Carl W. Hudson and Glen P. Hamner now U.S. Pat. No. 4,618,412; filed of even date herewith.

BACKGROUND OF THE INVENTION

I. Field of the Invention

This invention relates to a process for the conversion of a feed comprised of a fused multi-ring aromatic hydrocarbon, or fused multi-ring hydroaromatic hydrocarbon, or both, to lower molecular weight, lower boiling aromatics of improved octane useful as reformer feeds, or useful directly as high octane motor gasoline blending stocks. In particular, it relates to the conversion of the fused two-ring aromatic or hydroaromatic compounds of a hydrocarbon feed fraction with boiling range of about 350°–600° F. (177°–316° C.), especially a 400°–550° F. (204°–288° C.) boiling range fraction, to lower boiling aromatics, especially to alkyl-benzenes, to increase the volume of motor gasoline boiling range material ($<437°$ F.), and improve the octane level of said product.

II. Background and Problems

At least half, and usually much more, of every barrel of crude that is processed in a modern refinery is converted into motor gasolines. Motor gasolines are produced from streams obtained from many different refinery processes, after blending, and they are constituted principally of complex mixtures of paraffins, naphthenes, olefins and aromatic hydrocarbons. Gasolines generally boil within a range of from about $C_5^+ -437°$ F. (20°–225° C.). Improved engine performance demands significantly improved motor gasoline octane requirements, and consequently there is a constant demand upon refiners to increase the octane number level of its motor gasoline pool.

The principal hydrocarbons which are blended into a motor gasoline pool are virgin naphthas, catalytically cracked naphthas and hydrocracked naphthas. The $C_5-350°$ F. (20°–177° C.) fraction of virgin naphtha is normally low in octane and is catalytically reformed, primarily to produce high octane reformate. The $C_5^+ -350°$ F. (20°–177° C.) fractions of hydrocracked and catalytically cracked naphthas are typically of relatively high octane, and consequently these fractions are generally directly blended into the motor gasoline pool. The 350°–437° F. (177°–225° C.) fractions of all of these naphthas are also often blended directly into the motor gasoline pool.

The preponderance of fused multi-ring aromatic or fused multi-ring hydroaromatic hydrocarbons, or hydrocarbons which contain two or more fused aromatic or hydroaromatic rings are substantially excluded from motor gasoline by setting the high end boiling point at about 437° F. (225° C.), which is very near the boiling point of naphthalene 424° F. (218° C.) the lowest molecular weight fused multi-ring aromatic compound; or close derivitives derived therefrom, e.g., the corresponding hydroaromatic compound. It is thus known that the presence in motor gasolines of fused multi-ring aromatic or hydroaromatic hydrocarbons is undesirable inasmuch as they produce carbonanceous deposits when burned in internal combustion engines. The fused multi-ring aromatics are directly converted to carbon, and the fused multi-ring hydroaromatics are dehydrogenated back into their corresponding parent fused multi-ring aromatic hydrocarbons, respectively, and then converted to carbon; the same end result. The latter reaction is particularly favored at high temperatures and reduced hydrogen partial pressures such as prevails in internal combustion engines.

The presence of some fused two-ring aromatic or fused two-ring hydroaromatic hydrocarbons in gasolines is often tolerated, since these compounds generally provide acceptable octane, and are difficult to remove from the gasolines with any degree of economy. However, their presence in gasolines is costly in another way in that their presence results in increased carbon deposition in internal combustion engines, as discussed above. Therefore the high end point of motor gasolines is rarely permitted to much exceed about 437° F. (225° C.) because temperatures even slightly in excess of 437° F. (225° C.) will permit increased, and often unacceptable concentrations of the fused two-ring aromatic and hydroaromatic hydrocarbons in the gasolines. In conventional gasoline manufacturing the high end boiling point is thus set to exclude the preponderance of the fused two-ring aromatic or fused two-ring hydroaromatic hydrocarbons; and most definitely to exclude the preponderance of the higher boiling fused multi-ring aromatic and hydroaromatic hydrocarbons which contain three or more fused rings (sometimes termed PNA's for polynuclear aromatic hydrocarbons). Thus, these higher boiling fused multi-ring aromatic and hydroaromatic hydrocarbons are often blended into distillate fuels even though their cetane values are low.

There presently exists a pressing need for economically viable processes for improving the octane values of a refinery's motor gasoline blending pool. Thus, a practical process useful for the conversion of feeds comprised of fused two-ring aromatic and fused two-ring hydroaromatic hydrocarbons into lower boiling hydrocarbons of higher octane level suitable for direct use in motor gasoline is needed since this will not only improve the octane value of the motor gasoline blending pool, but can, by selective omission, even improve the quality of the distillate fuels as well. Moreover, feeds which have much above a 350° F. final boiling point cannot be used as reformer feeds due to excessive coke formation, and hence conversion of the coke precursors of such feeds to lower boiling alkylbenzenes can broaden the base of feedstocks available for use in reforming.

III. Objects

It is, accordingly, the primary object of this invention to fill these and other needs.

In particular, it is an object of this invention to provide a process for the conversion of fused multi-ring aromatic and fused multi-ring hydroaromatic hydrocarbons to lower boiling, high octane hydrocarbons, particularly alkyl-benzenes.

A specific object is to provide a process for the conversion of a feed rich in fused two-ring aromatic and fused two-ring hydroaromatic hydrocarbons into lower boiling aromatics, particularly alkylbenzenes, of high octane values.

It is a yet further, and more specific object to provide a process, generally as characterized, which is capable of converting feedstreams which are rich in fused two-ring aromatic and fused two-ring hydroaromatic hydrocarbons feedstreams to products suitable for improving the quality of a refinery motor octane blending pool; and also broaden the base of feedstocks available for reforming.

IV. The Invention

These objects and others are achieved in accordance with the present invention embodying a process wherein a liquid feed comprised of a fused multi-ring aromatic hydrocarbon compound, or fused multi-ring hydroaromatic hydrocarbon compound, or both, having an initial or low end boiling point of at least about 350° F. (177° C.) is contacted in the presence of hydrogen over a catalyst which contains elemental iron and one or more of an alkali or alkaline-earth metal [i.e., a Group IA or IIA metal (Periodic Table of the Elements, E. H. Sargent & Co., Copyright 1964 Dyna-Slide Co.)] or compound thereof, and preferably additionally a Group IIIA metal, or metal compound, particularly aluminum, or compound thereof, at temperature sufficient to selectively hydrogenate and hydrocrack said fused multi-ring aromatic hydrocarbon compound, or fused multi-ring hydroaromatic hydrocarbon compounds, or both, to produce lower molecular weight, higher octane components suitable for direct blending into gasoline. Preferably, the liquid hydrocarbon feed is contacted, with hydrogen, over the alkali or alkaline-earth metal promoted iron catalyst at temperature ranging from about 225° C. (437° F.) to about 430° C. (806° F.), preferably from about 250° C. (482° F.) to about 400° C. (752° F.), more preferably from about 300° C. (527° F.) to about 370° C. (698° F.) and at hydrogen partial pressures ranging from about 0 pounds per square inch gauge (psig) to about 1000 psig, preferably from about 100 psig to about 600 psig, and more preferably from about 100 psig to about 400 psig, sufficient to selectively hydrogenate and hydrocrack the fused multi-ring aromatic hydrocarbon compound, or fused multi-ring hydroaromatic hydrocarbon compound, or both. Feeds particularly susceptible to processing in accordance with this invention are admixtures of hydrocarbon compounds which contain a fused multi-ring aromatic hydrocarbon compound, or a fused multi-ring hydroaromatic hydrocarbon compound, or both, particularly admixtures wherein the initial boiling point of the feed is at least about 350° F. (177° C.) and wherein the high end boiling point of the feed ranges up to about 600° F. (316° C.), preferably from about 400° F. up to about 550° F. (204°–288° C.), and the feed is derived from petroleum or a synthetic liquid hydrocarbon admixture such as obtained from tar sands, coal liquids, shale oil, or the like.

The catalyst required for use in this invention can be supported or unsupported, but in ether instance the catalytic surface is one which is constituted essentially of metallic, or elemental iron (Fe°) crystallites about which the alkali or alkaline-earth metals are dispersed, generally as a monolayer of an alkaline oxide or alkaline-earth metal oxide. The catalyst is unsulfided, and can function in the presence of sulfur only when a sufficient portion of the catalytic surface of the catalyst is substantially metallic, or elemental iron (Fe°). The formation of sufficiently high concentrations of sulfur at the catalyst surface tends to produce catalyst deactivation via the formation of iron sulfide upon the catalyst surface as a consequence of which the use of feeds which contain high concentrations of sulfur or sulfur compounds should be avoided. High concentration of feed sulfur will soon deactivate the catalyst by converting a major portion of the metallic, or elemental iron surface of the catalyst to iron sulfide.

In the practice of this invention, an especially preferred class of feeds are those comprised of fused multi-ring aromatic or hydroaromatic compounds having a total of two-rings to the molecule, or feeds which consist essentially of, or contain fused multi-ring aromatic or hydroaromatic compounds having a total of two-rings to the molecule. The 400° F.+ (204° C.+) fractions of many refinery feedstocks, particularly virgin and processed naphthas and distillates thus contain significant amounts of fused multi-ring aromatics or hydroaromatics which have a total of two-rings to the molecule and accordingly are useful as feeds for the practice of this invention. Such compounds can be selectively hydrogenated and hydrocracked to lower molecular weight, lower boiling higher octane aromatic products suitable for direct use in gasoline, or useful as reformer feeds. In the 350°–600° F. (177°–316° C.) boiling range fractions, the fused multi-ring aromatics or hydroaromatics of these feedstocks consist principally of naphthalene and its derivitives which are two-ring compounds. In an ideal reaction sequence carried out in accordance with this invention with such compounds, or feed containing such compounds, naphthalene or tetralin, for example, would react as follows to produce single ring aromatics, including alkylbenzenes, and benzene, to wit:

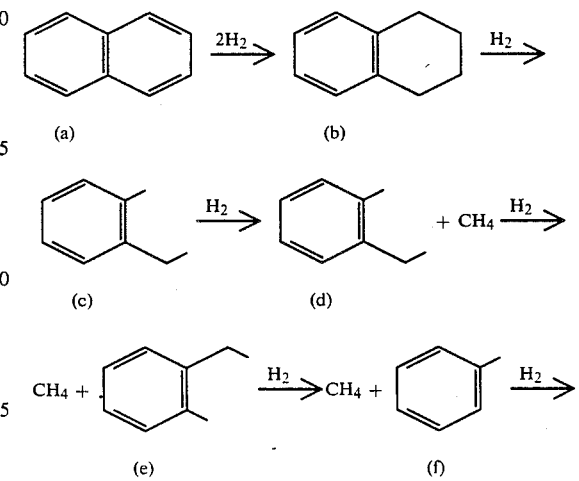

-continued $$CH_4 + \text{(benzene ring)}$$
(g)

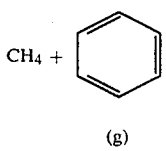

The significance of this reaction sequence is that the fused ring compounds are selectively converted to benzene derivitives without hydrogenation of the last aromatic ring. Naphthalene is thus converted to single ring aromatics, including alkylbenzenes and benzene. In most circumstances such reaction is preferably terminated short of producing compound (d), or after the initial ring further conversion requires the consumption of hydrogen, produces excess methane, and does little to further improve octane. Mild conditions, as described herein favor such result. Single aromatic ring products produced in such reaction normally need not be reformed, but rather blended directly into the gasoline pool.

The fused two-ring aromatic and hydroaromatic compounds, or feedstocks which contain such compounds, are the preferred feeds. Such compounds are exemplified by such aromatics as naphthalene, or naphthalene derivatives, indene, or indene derivatives, and such hydroaromatics as tetralin, or tetralin derivatives, and indane, or indane derivatives.

Fused multi-ring aromatic or hydroaromatic compounds which contain three or more rings in the total molecule, or feeds which contain such compounds in admixture with other hydrocarbon compounds, can also be treated in accordance with this invention to produce lower molecular weight, lower boiling aromatics products which can in some instances be directly added, in whole or in part, to the gasoline pool. However, the conversion of the three-ring, and higher, aromatic molecules into motor gasoline of boiling range $C_5-437°$ F. requires high hydrogen consumption, accompanied by high levels of methane production. The preferred feeds, to summarize, are those which consist essentially of, or contain fused two-ring aromatic or hydroaromatic compounds, especially those boiling within a range of from about 350° F. (177° C.) to about 600° F. (316° C.), and more preferably those boiling within a range of from about 400° F. (204° C.) to about 550° F. (288° C.).

The feed is contacted with hydrogen, or hydrogen-containing gas, over said iron catalyst, preferably over a fused iron catalyst, at reaction conditions sufficient to selectively hydrogenate and hydrocrack the fused multi-ring aromatic and hydroaromatic hydrocarbon compounds of the feed to produce lower molecular weight, lower boiling aromatic molecules. Suitably, the reaction is conducted at temperatures ranging from about 225° C. (437° F.) to about 430° C. (806° F.), preferably from about 250° C. (482° F.) to about 400° C. (752° F.) more preferably from about 300° C. (572° F.) to about 370° C. (698° F.) under an atmosphere of hydrogen gas or admixture of hydrogen and another gas, or gases, within which the hydrogen partial pressure ranges from about 0 psig to about 1000 psig, preferably from about 100 psig to about 600 psig, and more preferably from about 100 psig to about 400 psig. Some positive pressure of hydrogen is necessary in conducting the reaction, though the hydrogen pressure can be at atmospheric pressure, or less. In some instances it can be advantageous to add non-oxiding gases other than hydrogen to the treat gas to modify, improve, or control the reaction, e.g., nitrogen, ammonia, methane, carbon monoxide, carbon dioxide, or the like. The combination of temperature and hydrogen partial pressure are preferably such that a part of the feed, at reaction conditions, is in vapor phase. Temperatures above about 430° C. (806° F.) generally should not be employed because excessive temperature causes cracking of the feed, which can lower liquid yields. At temperatures below about 225° C. (437° F.) on the other hand, the rate of reaction is generally too slow as to be practical. Total pressures are not critical, but generally range from about 0 psig to about 1500 psig, preferably from about 100 psig to about 1000 psig. Treat gas rates, based on hydrogen, range from about 500 to about 10,000 SCF/B, preferably from about 1000 to about 5000 SCF/B. Space velocities range generally from about 0.05 LHSV to about 20 LHSV, preferably from about 0.2 LHSV to about 10 LHSV.

The catalyst is constituted of elemental iron, modified with one or more alkali or alkaline-earth metals, or compounds thereof, sufficient to produce on contact with a feed at reaction conditions selective hydrogenation and hydrocracking of the fused multi-ring aromatics and hydroaromatics of the feed without significant cracking of lower molecular weight hydrocarbon components of the feed. In such reactions carbon-carbon bond cleavage in the fused multi-ring aromatics and hydroaromatics is achieved; thus producing some lower molecular weight aromatic liquid hydrocarbons with the result that there is an increase in high octane, gasoline boiling range material. The reaction is carried out over catalysts which contain iron, preferably as the major component, or major metal component. The catalyst may be bulk (unsupported) iron, or iron dispersed upon a support. The bulk iron catalyst is preferred and it may be employed as essentially metallic iron in bulk, or as a bulk iron promoted or modified with alkali or alkaline-earth metals, or metal oxides such as sodium, potassium, cesium, magnesium, calcium, barium, or the like. The active iron catalyst, when a bulk iron catalyst, is preferably one which contains at least 50 percent elemental iron, preferably from about 70 percent to about 98 percent elemental iron, based on the weight of the catalyst. The iron catalyst, when a catalyst wherein the iron is distributed or dispersed upon a support, contains at least about 0.1 percent iron (measured as elemental iron), preferably from about 0.1 percent to about 50 percent iron, and more preferably from about 5 percent to about 25 percent iron, based on the total weight of the catalyst, and the supported metallic component, exclusive of the support component, or components, contains at least 50 percent iron (measured as elemental iron), and preferably from about 70 percent to about 98 percent iron.

A bulk or unsupported fused iron catalyst is preferred. The fused iron catalyst is one fused by heating and melting the iron, preferably with an alkali or alkaline-earth metal, or metals, the alkali or alkaline-earth metal, or metals, generally being present in concentrations ranging from about 0.01 percent to about 10 percent, preferably from about 0.2 percent to about 4 percent, based on the total weight of catalyst. Sodium, potassium, cesium, magnesium, calcium, and barium are the preferred alkali or alkaline-earth metals. Aluminum, principally as an oxide ($Al_2O_3$), or compound thereof is also a preferred promoter, or modifier, of the fused iron, and it is preferably contained in the catalyst in concentration ranging from about 0.01 percent to about 20 percent, preferably from about 0.5 percent to about 5 percent calculated as aluminum oxide ($Al_2O_3$) based on the total weight of the catalyst. Other metals may also be used as promoters and/or modifiers, such metals including rhenium, nickel, cobalt, palladium, platinum, and copper. Such metals may be added to the catalyst alone or admixed one metal with another, or with other metals.

The iron based catalyst, as suggested, may also be supported; preferably upon an inorganic oxide support. Supports include, but are not limited to, the oxides of aluminum, silicon, boron, phosphorous, titanium, zirconium, calcium, magnesium, barium, and mixtures of these and other components. Other supports may include clays, such as bentonite, zeolites, and other alumino-silicate materials, e.g., montmorillionite. Additional supports may be selected from the group of refractory carbides and nitrides of the transition metals of Groups IVB, VB, VIB, VIIB, and Group VIII iron group metals. Alumina, magnesia, and mixtures of alumina and magnesia are preferred supports. The iron based catalysts are prepared by methods which include precipitation, coprecipitation, impregnation, vapor deposition, and the formation of metal complexes (i.e., metal carbonyl, ect.) and the like. The impregnation of a porous inorganic oxide support, such as alumina, with a solution of an iron salt with subsequent drying, calcination and reduction of the supported iron catalyst by contact and treatment of the catalyst with hydrogen or hydrogen and ammonia, or ammonia in admixture with another reducing gas, or gases, has been found to provide a highly active catalyst for selectively hydrogenating and hydrocracking the fused multi-ring aromatics and hydroaromatics to produce lower boiling, high octane components for use in motor gasoline. Impregnation of the support with iron, or iron and other metal promoters or modifiers, by the incipient wetness technique; or technique wherein the iron is contained in solution in measured amount and the entire solution absorbed into the support, subsequently dried, calcined, and activated is preferred. The supported iron catalyst is promoted or modified with alkali or alkaline-earth metals, or metal oxides such as sodium, potassium, cesium, magnesium, calcium, barium, or the like. The alkali or alkaline-earth metal, or metals, or compounds thereof are generally employed in concentrations ranging from about 0.01 percent to about 10 percent, preferably from about 0.2 percent to about 4 percent, based on the total weight of metal, exclusive of the weight of the support. Sodium, potassium, cesium, magnesium, calcium, and barium are the preferred alkali or alkaline-earth metals. Aluminum, principally as an oxide, or compound thereof, is also a preferred promoter, or modifier, and it is preferably employed in the catalyst in concentration ranging from about 0.01 percent to about 20 percent, preferably from about 0.5 percent to about 5 percent, calculated as aluminum oxide ($Al_2O_3$), based on the total weight of metal, exclusive of the weight of the support. Rhenium, nickel, cobalt, palladium, platinum, and copper metals, or compounds thereof, can also be added to the catalyst as promoters or modifiers, these metals generally being added in concentrations ranging from about 0.01 percent to about 10 percent, preferably in concentration ranging from about 0.5 percent to about 2.5 percent, based on the weight of the supported component, exclusive of the weight of the support. After impregnation of the support, the metal impregnated support is dried generally at temperatures ranging from about 65° C. (149° F.) to about 280° C., (536° F.) preferably from about 80° C. (176° F.) to about 110° C., (230° F.) in circulating air, vacuum or microwave oven. The calcination is suitably conducted at temperatures ranging from about 300° C. (572° F.) to about 650° C. (1202° F.), preferably from about 450° C. (842° F.) to about 550° C. (1022° F.).

The iron catalysts can be reduced, activated, or reactivated by contact with hydrogen, by sequential contact with hydrogen and ammonia, or reduced and activated by contact with an admixture of ammonia and hydrogen or by contact with an admixture of ammonia and another reducing gas or gases. The reducing gas and ammonia can be generated in situ or ex situ. The catalysts are more effectively activated if activated by contact with a stream of flowing hydrogen, or by contact with a stream characterized as an admixture of hydrogen and ammonia, or admixture of ammonia and another reducing gas, or gases. In addition, other pretreatment conditions may be used in combination with reduction in order to modify and/or enhance the catalyst. Treatment with a hydrogen rich blend with some carbon containing gas, e.g., carbon monoxide or carbon dioxide, can be used to introduce carbon to the catalyst. In a similar manner hydrogen blends with nitrogen containing gases, e.g., ammonia, can be used to modify catalyst activity and selectivity. High temperature air or oxygen containing gas treatments can also be used to modify catalysts prior to the hydrogen reduction.

The catalyst is reactivated, after deactivation, by contact with hydrogen, or by contact with ammonia in admixture with hydrogen, or ammonia in admixture with another reducing gas, or gases. Similarly, the activity-maintenance of the catalyst can sometimes improve during an operating run by introducing ammonia, or ammonia in admixture with another gas, or gases, with the nitrogen-containing feed. In general, the ammonia is employed in admixture with another gas, or gases, in concentration ranging from about 0.01 percent to about 20 percent, preferably from about 0.2 percent to about 10 percent, based on the volume of the gas.

The catalyst is activated, pretreated, or reactivated by contact with the gas, or gaseous admixture, at temperatures ranging from about 300° C. (572° F.) to about 600° C. (1112° F.), preferably from about 400° C. (752° F.) to about 500° C. (932° F.). Suitably pressures range from about 0 psig to about 1500 psig, preferably from about 0 psig to about 1000 psig. Hydrogen partial pressures generally range from about 0 psig to about 1000 psig, preferably from about 100 psig to about 600 psig. Space velocities generally range from about 100 GHSV to about 10,000 GHSV, preferably from about 1000 GHSV to about 5000 GHSV.

The invention will be more fully understood by reference to the following demonstrations and examples which present comparative data obtained from runs illustrating its more salient features. All parts are given in terms of weight except as otherwise specified.

A commercial BASF-R fused iron ammonia synthesis catalyst was employed in conducting the tests and demonstrations described in the following examples. The BASF-R fused iron catalyst was supplied by the manufacturer as a preactivated or prereduced catalyst. It was treated by contact with hydrogen prior to use. The chemical and physical properties of this catalyst are given in Table I, as follows:

TABLE I

Chemical Composition and Physical Characteristics of
Commercial Fused Iron Catalyst (as received)

|  | BASF-R Catalyst |
|---|---|
| I. Chemical Composition, Wt. % | |
| FeO | <1 |
| $Fe_2O_3$ | <1 |
| Free Fe | 90–95 |
| Total Fe Oxides | <2 |
| $Al_2O_3$ | 2.0–3.0 |
| $K_2O$ | 0.5–1.0 |
| CaO | 0.5–1.5 |
| $SiO_2$ | <0.5 |
| P | Trace |
| S as $SO_3$ | Trace |
| Chloride | <10 ppm |
| II. Physical Characteristics | |
| Bulk Density | 120 lb/cu ft in reduced form |

In conducting these runs stainless steel tubular reactors were employed, the feed and hydrogen having been cocurrently introduced into a reactor and passed over a fixed bed of fused iron catalyst centered within a reactor. In introducing the feed, a positive displacement pump was used to feed the liquid hydrocarbon, which was then admixed with hydrogen prior to entering a reactor. An infrared furnace was employed to heat a reactor, and the temperature of the reaction was measured by a thermocouple located within the catalyst bed, and controlled by the use of an automatic temperature controller in operative association with the infrared furnace. Products exiting a reactor were collected in a cooled receiver. A back pressure regulator was employed to maintain the desired pressure in a reactor.

The product collected from a reactor was analyzed by gas chromatography (G.C.) using a capillary column to obtain separation of the various feed and product components.

EXAMPLE 1

In the first run, designated Example 1, a 7.77 g/4.0 mL charge of BASF-R fused iron catalyst (14–35 mesh) was charged to a ⅜" stainless steel downflow reactor and pretreated in flowing hydrogen (300 mL/min.; 4500 GHSV) at 400° C. (752° F.) for 0.5 hour and 450° C. (842° F.) for 0.5 hour. The reactor was then cooled to 315° C. (599° F.) and the reaction begun. The feed was a mixture of naphthalene (reagent grade; commercial source) dissolved at a 2 wt. % concentration in hexadecane (reagent grade; commercial source). This model feed mixture which was fed to the reactor after mixing with hydrogen, was heated in the reactor above the catalyst bed. The total liquid hourly space velocity, LHSV, was 2.0. Liquid products from the reactor exit were collected in a cooled receiver flask and analyzed by standard gas chromatography (GC) techniques using a flame ionization detector and a capillary column. The results from this run as shown in Table II.

TABLE II

Conversion of Naphthalene to Lower
Molecular Weight Alkylbenzenes (and Benzene)

Feed: 2 Wt. % Naphthalene in Hexadecane
Hydrogen Treat Gas Rate: 45 mL/min. (1900 SCF/B)
LHSV: 2.0

| Conditions | | | Products (% Yield)[1] | | | | |
|---|---|---|---|---|---|---|---|
| °C. | (°F.) | PSIG | Tetralin | $C_3$ Benzenes | $C_2$ Benzenes (Xylene, Ethyl-Benzene) | Toluene | Benzene |
| 315 | (599) | 100 | 50 | Trace | 4 | 12 | 7 |
| 330 | (626) | 200 | 27 | 2 | 19 | 28 | 7 |

[1] The balance of carbon-containing products was comprised of methane formed via further hydrogenolysis following tetralin ring opening.

These results clearly illustrate the facile conversion of the two ring aromatic feed component, naphthalene, to lower molecular weight benzene and alkylbenzenes, products which are desirable motor gasoline blend components. Moreover, the selectivity in this reaction is quite high for hydrogenation and ring opening of the multi-ring aromatic component relative to random hydrogenolysis. This was shown by analysis of the hexadecane conversion products ($C_{15}$, $C_{14}$, $C_{13}$, etc. alkanes) which were formed in less than 1% total yield (based on the original hexadecane concentration). This represents a significant selectivity advantage for conversion of multi-ring aromatics/hydroaromatics vis-a-vis the random hydrogenolysis of non-aromatic feed components.

In Examples 2 and 3, which follow, commercial-type feeds were employed using a reactor unit similar to that used in conducting the preceding run. This unit differed from that used in the preceding run principally in that the unit employed an upflow reactor with a feed preheat line (made of ⅛ inch S.S. tubing) connecting with the bottom of a ⅜ inch S.S. reactor.

EXAMPLE 2

In a second run, Example 2, a 1.28 g/6.0 mL charge of the prereduced BASF-R fused iron catalyst was loaded into the ⅜ inch S.S. reactor. The catalyst was then given a 1.5 hour pretreat at 450° C. (842° F.), 150 psig, and 200 mL/min (2000 GHSV) flowing $H_2$. The feedstock used was a hydrocracker (H/C) R-1 (first reactor) product fraction, obtained from a commercial hydrocracking unit, which had the general boiling range of 200°–500° F. (93°–260° C.). This material contained less than 10 wppm (parts per million, by weight) sulfur and less than 5 wppm nitrogen by analysis. The conversion of 350° F.+ to 350° F.− material was monitored in this experiment by a GC distillation (GCD) procedure based on a number of model compounds of known boiling points. The amount of 350° F.− material in the feed was determined by this GCD procedure to be about 6%. This feed was loaded into a clean feed pump buret and then passed over the activated fused iron catalyst at the conditions given in Table III. The results of this run clearly show the conversion of multi-ring, primarily two-ring, aromatics and hydroaromatics to lower boiling, gasoline range material.

TABLE III

Conversion of H/C R-1 Product Fraction
[200-500° F. (93-260° C.)]
Over Fused Iron Catalyst
to Produce High Octane, Light Aromatics Pressure: 150 psig
Hydrogen Treat Gas Rate: 50-55 mL/min.
(2600-2800 SCF/B)

| Temperature | | LHSV | % 350° F.− | % 350-420° F. | % 420° F.+ | % Conv. to 350° F.− |
|---|---|---|---|---|---|---|
| °C. | (°F.) | | | | | |
| feed | — | — | 6 | 33 | 61 | — |
| 300 | (572) | 1.1 | 18 | 40 | 42 | 13 |
| 315 | (599) | 1.1 | 26 | 39 | 35 | 21 |
| 330 | (626) | 1.1 | 40 | 35 | 25 | 36 |
| 350 | (662) | 3.3 | 19 | 35 | 46 | 14 |

Note:
The boiling ranges and conversions were determined using a simple GC distillation-type procedure based on a number of model compounds of known boiling points.

A composite of the fractions obtained in Example 2 was distilled in order to obtain an actual average conversion value. A total of 230 g of composite product was distilled through an efficient column to give 55 g (24%) of material boiling lower than 350° F. This translates into an actual average 350° F.+ to 350° F.− conversion of 21% over the course of the run (53 hours) at the various conditions noted.

An octane value for this distilled 350° F.− material was obtained by a GC technique in which the volatile components of a sample are compared to known standards and a relative octane value is calculated. The value thus obtained was a RONC (research octane number clear) of 110. This high value clearly indicates the available potential for motor fuel production via the process of this invention.

Further analysis of this 350° F.− conversion product by GC indicated that the material contained about 81% aromatics with the following compositional breakdown:

12.7% light saturates
6.7% benzene
21.8% toluene
30.3% xylenes and ethylbenzene
20.1% $C_3$ aromatics
2.3% $C_4/C_4+$ aromatics.

The high concentration of benzene, toluene, and xylenes (BTX) found in this product indicates its potential for use as both a motor gasoline blending component and a chemicals intermediate, or product stream.

EXAMPLE 3

In a third run, Example 3, an 11.36 g/6.0 mL charge of the prereduced BASF-R fused iron catalyst (35–50 mesh) was loaded into ⅜ inch diameter stainless steel reactor. This material was then given a reductive pretreatment at 350° C. (662° F.) for 0.5 hour and 400° C. (752° F.) for 1.0 hour under 150 psig with 200 mL/min (2000 GHSV) flowing hydrogen. The feedstock was prepared from a commercial hydrocracker recycle stream. By distillation, a heart-cut fraction with the general boiling range of about 300°-550° F. (149°-288° C.) was recovered from the H/C recycle stream. This heart-cut fraction contained about 17 wt. % material boiling below 350° F. (177° C.), less than 5 wppm sulfur and less than 1 wppm nitrogen by analysis. As in Example 2, the conversion of 350° F.+ to 340° F.− material was monitored by a GCD procedure. Table IV shows the conversion results obtained at the various run conditions employed.

TABLE IV

Conversion of H/C Heart-cut Recycle Fraction
(300-550° F.; 149-288° C.)
to Lower Boiling, High Octane Aromatics

| Sample | (149° C.−) % 300° F.− | (149-177° C.) % 300-350° F. | (177-204° C.) % 350-400° F. | (204-227° C.) % 400-440° F. | (227° C.+) % 440° F.+ | % 350° F.− CONV.[1] | Temp. °C. | (°F.) | Pres. PSIG | TGR SCF/B | LHSV |
|---|---|---|---|---|---|---|---|---|---|---|---|
| Feed | 9 | 8 | 20 | 31 | 32 | — | — | — | — | — | — |
| 3-1 | 29 | 12 | 22 | 20 | 17 | 29 | 350 | (662) | 150 | 3700 | 1.0 |
| 3-2 | 31 | 12 | 22 | 19 | 16 | 31 | 350 | (662) | 150 | 2900 | 1.5 |
| 3-3 | 25 | 12 | 22 | 22 | 19 | 25 | 350 | (662) | 150 | 2200 | 2.1 |
| 3-4 | 20 | 11 | 21 | 25 | 23 | 17 | 340 | (664) | 150 | 2200 | 2.1 |
| 3-5 | 17 | 10 | 21 | 25 | 26 | 13 | 325 | (617) | 200 | 2200 | 2.1 |
| 3-6 | 10 | 8 | 21 | 30 | 31 | 1 | 200 | (392) | 150 | 2200 | 2.1 |
| 3-7 | 23 | 11 | 22 | 23 | 21 | 20 | 350 | (662) | 150 | 2200 | 2.1 |

[1]The boiling ranges and conversions were determined using a simple GC distillation-type procedure based on a number of model compounds of known boiling points.

These results show the expected conversion of multiring aromatic or hydroaromatic components in the feedstock to lower boiling material. The relative octane values for the 350° F.− portions of both feed and products were determined in the following manner, to wit: A composite was made of the product fractions and this combined material was distilled through an efficient column to give 350° F.− and 350° F.+ fractions. The same procedure was applied to the feedstock to give comparable fractions. The 350° F.− fractions from both feedstock and product were submitted for engine octane analyses. A normal octane analyzer engine was used and the octane values were determined by comparison to standard reference fuels. The results of these determinations are shown in Table V.

TABLE V

Engine Octane Analyses on 350° F.− Portions of
H/C Heart-cut Recycle Fraction and
Fused Iron Catalyst Conversion Product Composite

| | H/C Heart-Cut Recycle Feed | Conversion Product Composite |
|---|---|---|
| Wt. % 350° F.− | 16.5 (547 g) | 33.5 (528 g) |
| Wt. % 350° F.+ | 83.5 (2761 g) | 66.5 (1035 g) |
| MONC[1] | 80.2 | 86.0 |
| RONC[2] | 92.0 | 98.3 |

[1]Motor octane number clear
[2]Research octane number clear

As the results in Table V indicate, not only did treatment of the feed over the activated fused iron catalyst convert a significant portion of the feed to lower boiling product, but additionaly the octane values of the converted portions were dramatically improved. This example, clearly demonstrates the use of this invention to produce high value, higher octane motor gasoline blending components.

It is apparent that various modifications and changes can be made without departing the spirit and scope of the invention.

Having described the invention, what is claimed is:

1. A process for the conversion of a feed comprised of hydrocarbon compounds selected from the group consisting of a fused two-ring aromatic hydrocarbon compound, a fused two-ring hydroaromatic hydrocarbon compound, and an admixture of fused two-ring aromatic hydrocarbons and fused two-ring hydroaromatic hydrocarbons, having an initial boiling point of at least about 177° C. (350° F.), to lower boiling, higher octane hydrocarbons which comprises:

contacting said feed, in the presence of hydrogen, over a catalyst comprised of elemental iron and one or more alkali or alkaline-earth metals components at a temperature ranging from about 225° C. to about 430° C. and hydrogen partial pressure ranging from about 0 psig to about 1000 psig sufficient to selectively hydrogenate and hydrocrack said fused two-ring aromatic hydrocarbon compound, or fused two-ring hydroaromatic hydrocarbon compound, or both, to produce a lower molecular weight, higher octane product.

2. The process of claim 1 wherein the feed has a boiling range of from about 177° C. (350° F.) to about 316° C. (600° F.).

3. The process of claim 1 wherein the feed has a boiling range of from about 204° C. (400° F.) to about 288° C. (550° F.).

4. The process of claim 1 wherein the feed is an admixture of predominantly fused two-ring aromatic hydrocarbons, and fused two-ring hydroaromatic hydrocarbons.

5. The process of claim 4 wherein the feed boils within a range of from about 204° C. (400° F.) to about 288° C. (550° F.).

6. The process of any of claims 1 through 5 wherein the reaction is conducted at temperature ranging from about 250° C. to about 400° C. and at hydrogen partial pressure ranging from about 0 psig to about 600 psig.

7. The process of any of claims 1 through 5 wherein the reaction is conducted at temperature ranging from about 300° C. to about 370° C. and at hydrogen partial pressure ranging from about 0 psig to about 600 psig.

8. The process of any one of claims 1 through 5 wherein the catalyst is a bulk iron catalyst and contains at least 50 percent elemental iron.

9. The process of any one of claims 1 through 5 wherein the catalyst is a bulk iron catalyst and contains at least 70 percent to about 98 percent iron.

10. The process of any one of claims 1 through 5 wherein the catalyst is one wherein the iron is dispersed upon a support, and contains at least about 0.1 percent iron, based on the total weight of the catalyst, exclusive of the support component, or components.

11. The process of any one of claims 1 through 5 wherein the catalyst is one wherein the iron is dispersed upon a support, and contains from about 0.1 percent to about 50 percent iron, based on the total weight of the catalyst, exclusive of the support component, or components.

12. The process of any one of claims 1 through 5 wherein the catalyst is one wherein the iron is dispersed upon a support, and contains from about 70 percent to about 98 percent iron, exclusive of the support component, or components.

13. The process of any one of claims 1 through 5 wherein the feed is reacted over a bulk iron catalyst which contains one or more alkali or alkaline-earth metals in concentrations ranging from about 0.01 percent to about 10 percent.

14. The process of any one of claims 1 through 5 wherein the iron is dispersed upon an inorganic oxide support, the catalyst contains one or more alkali or alkaline-earth metals in concentration ranging from about 0.01 percent to about 10 percent, and a Group III metal in concentration ranging from about 0.01 percent to about 20 percent.

15. The process of any one of claims 1 through 5 wherein the feed is reacted over a bulk iron catalyst which contains said alkali or alkaline-earth metals in concentration ranging from about 0.2 percent to about 4 percent.

16. The process of any one of claims 1 through 5 wherein the iron is dispersed upon an inorganic oxide support and the catalyst contains said alkali or alkaline-earth metals in concentration ranging from about 0.01 percent to about 10 percent.

17. The process of any one of claims 1 through 5 wherein the iron is dispersed upon an inorganic oxide support and the catalyst contains said alkali or alkaline-earth metals in concentration ranging from about 0.2 percent to about 4 percent.

18. The process of any one of claims 1 through 5 wherein the iron is dispersed upon a support, and contains from about 5 to about 25 percent iron, based on the total weight of the catalyst, exclusive of the support component or components.

* * * * *